United States Patent [19]

Cupler, II

[11] 4,402,636
[45] Sep. 6, 1983

[54] CONVERTIBLE MACHINING CENTER

[76] Inventor: John A. Cupler, II, 10 Cupler Dr. - LaVale, Cumberland, Md. 21502

[21] Appl. No.: 184,679

[22] Filed: Sep. 8, 1980

[51] Int. Cl.³ .............................................. B23B 41/14
[52] U.S. Cl. ..................................... 408/14; 408/135; 408/136; 408/235; 408/704
[58] Field of Search ................. 408/1 R, 14, 135, 136, 408/137, 46, 89, 99, 124, 234, 235, 704

[56] References Cited

U.S. PATENT DOCUMENTS

| 971,679 | 10/1910 | Kirby | 408/135 X |
| 1,893,965 | 1/1933 | Sherman | 408/14 |
| 4,182,588 | 1/1980 | Burkart et al. | 408/14 |

Primary Examiner—Z. R. Bilinsky
Attorney, Agent, or Firm—Colton & Stone, Inc.

[57] ABSTRACT

A machining center convertible between micro and macro machining operations with elimination of reactive spring back infeed pressures in the macro machining mode.

4 Claims, 6 Drawing Figures

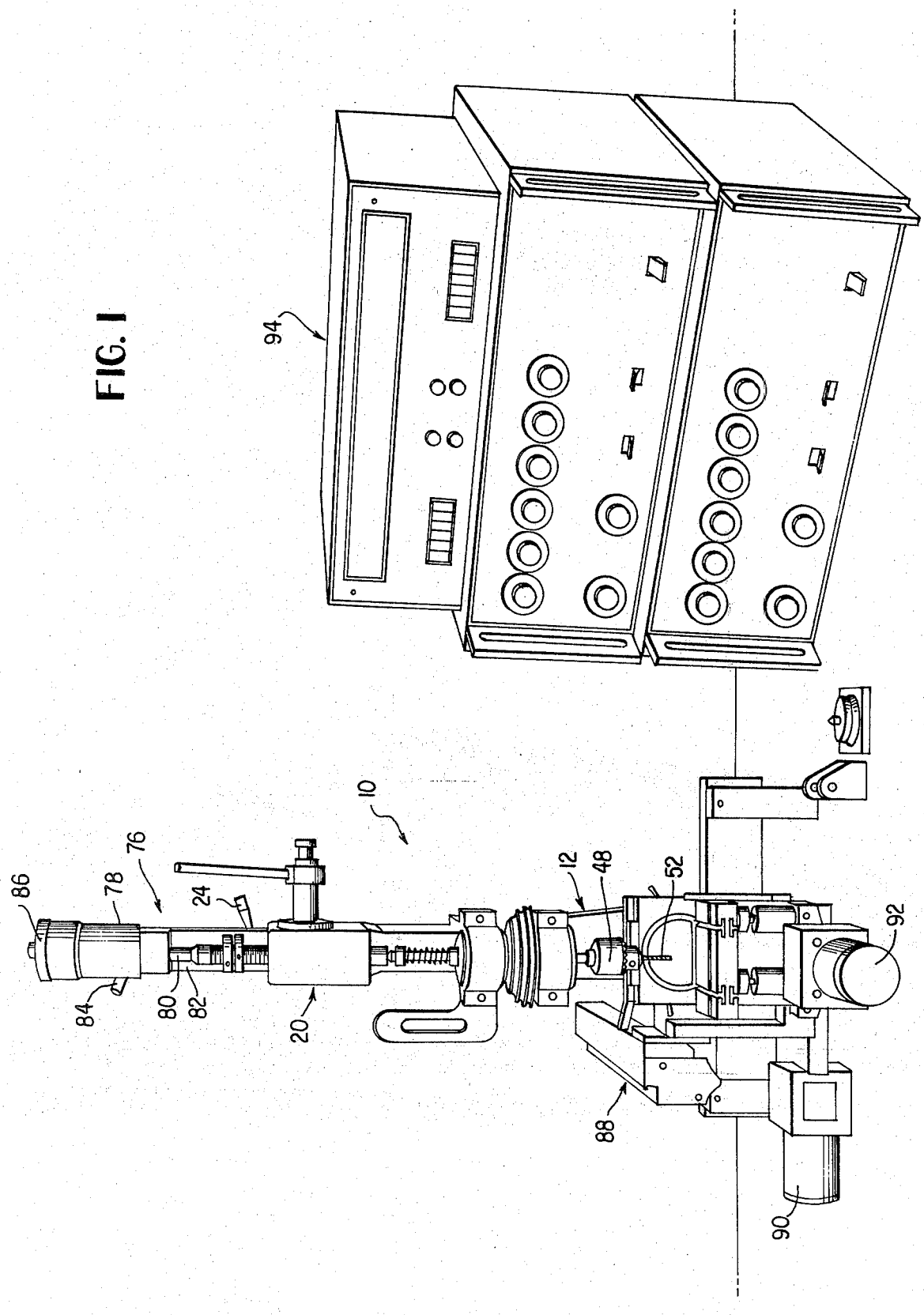

CONVERTIBLE MACHINING CENTER

BACKGROUND OF THE INVENTION

In micro machining operations such as in the range below 0.040", for example, it is essential that both tool infeed pressure and tool infeed depth be carefully controlled and that infeed pressure be applied in such fashion that no lateral force components are imparted to the tool. This because of the inherent fragility of micro tools as a function of their small diameters, many of which are barely perceptible to the human eye.

The state of the art insofar as micro tool infeed pressure application is concerned is exemplified by the cross arm pivot mounted drill feed mechanism manufactured by National Jet Company, Cumberland, Maryland, for its Model 1M micro drilling machine as illustrated and described in National Jet Company Technical Bulletin No. M1-168. This infeed mechanism is normally balanced for zero torque exertion with a drill travel and sensitivity ratio producing a 20-fold touch sensitivity amplification. Such extreme sensitivity in the control of infeed pressure is, of course, critical in micro drilling operations since even if the drill is maintained in pure compression it is subject to fracture if too great an infeed pressure is applied.

In similar fashion, depth gauging is of critical importance in micro drilling to prevent excessive drill heat, permit chip removal and avoid tool breakage by the inattentive operator. Such a depthing device allowing operator control of hole depthing advance from 0.0004" to 0.005" is manufactured by National Jet Company under Model No. F as described in National Jet Company Accessory Bulletin No. 0 DD-1167.

In the case of macro machining operations, the foregoing considerations of infeed pressure and depthing control are of lesser concern from the standpoint of tool breakage since the larger tool diameters, per se, provide inherent strength, making the tool more forgiving of that rough usage typically associated with macro machining such as, for example, the application of excessive infeed pressures.

Consequently, that accuracy of control necessarily associated with micro machining has not been applied to macro machining operations even though the corollary benefits of such control are significant. Exemplary is the accurate blind hole bottoming that is only possible in the absence of reactive machine spring back in response to infeed pressures, cooler running tools with consequent life extension and faster machining operations since excessive tool wear is one function of excessive infeed pressures.

While the instant invention is concerned with the convertibility of a single machine for both micro and macro machining operations which may include, inter alia, drilling, reaming, broaching and boring; the infeed control criteria that apply in micro machining operations are inapplicable for macro machining. In the case, for example, of the cross arm infeed mechanism used for micro drilling the relatively great length of the cross arm, infeed lever and connecting rod that make possible the sensitivity amplification necessary for micro drilling provides a long reaction lever arm which, when the necessarily greater infeed pressures are applied in macro drilling, results in a substantial "spring back" in reaction to drill infeed. This "spring back" results, inter alia, in inaccurate depthing. In further explanation; that path, through the machine frame, along which the reaction to tool infeed against the workpiece travels back to the point of input pressure application is that path along which spring back occurs. As is obvious, the extent of spring back is a direct function of input pressure, reaction path length, configuration of path length and mass and material through which the reaction path length extends. Thus if, for example, it is desired to advance a macro drilling tool a distance X into a workpiece and the depthing gauge against which pressure application will be directly applied is set for a depthing distance X, as the tool engages the workpiece the resistance encountered produces a reactive "spring back" through the machine frame to the point of pressure application of magnitude Y as considered linearly along the overall path length. Under such circumstances the actual hole advance will be X-Y rather than the desired hole advance X. To reiterate, this "spring back" just described is not a significant factor affecting micro machining operations because there are other, more limiting, parameters that make it necessary to exert such small infeed pressures as to render the spring back factor negligible, viz., considerations of tool breakage. If, on the other hand, such small infeed pressures were used in connection with macro machining, machining time would be prohibitive.

Inaccurate blind hold depthing is a major cause for part rejection in two large fields of machining activity; diesel nozzle and spinnerette manufacture. Thus, the macro drilled blind sac hole in a diesel nozzle and the counterbored blind hole depth in spinnerettes must be held to closer tolerances than are permitted by that inherent spring back in conventional drilling machines applying maximum rated infeed pressure. Consequently, it is necessary to use less than desirable infeed pressure as the desired hole bottom is approached to remain within tolerances. The result is increased machining time. Of equal consideration is the inattentive operator who continues to apply maximum infeed pressure as hole bottom is approached resulting in a blind hole to less than spec depth and/or the operator who does not have the "feel" for the lesser pressure application. A typical diesel nozzle sac hole is 0.118" in diameter while a typical spinnerette counterbore is 0.125" in diameter, both of which size macro drills have the inherent strength to produce the spring back herein referred to at rated infeed pressure applications for such sized tools.

In addition to workpiece inaccuracy, spring back produces machine fatigue in those movable and interfitted parts lying along the spring back path. The "feel" of the occurring spring back is a "spongy" feel in the equipment and the relative movement produces machine frame wear particularly adjacent working bushings and moving parts.

SUMMARY OF THE INVENTION

The concept herein disclosed is that of a single machine readily convertible between micro and macro machining operations while retaining, in the macro machining mode, that tool depthing and infeed precision usually associated only with micro machining.

Conversion from the micro to the macro machining mode requires nothing more than the substitution of a chuck for a collet, removal of the micro infeed mechanism and repositioning of a macro machining infeed head from a rearward inactive position to a forward, infeed spindle engaging position.

The macro tool infeed head herein disclosed introduces a new concept in macro machining; the elimination of reactive spring back. Stated differently, substantially all torque moments are eliminated from the infeed reactive path length extending from the point of tool engagement with the workpiece back along the machine frame elements to the point of input pressure application or to a fixed depthing stop, whichever comes first in the reactive path. This is accomplished by a colinear arrangement of tool, infeed spindle, infeed driver assembly and depth stop.

In one form of the invention, the infeed driver is a rack which, itself, is formed with precision screw threads, in addition to the rack teeth, and the depthing stop is carried by the rack.

BRIEF DESCRIPTION OF THE DRAWINGS

FIG. 1 is a front elevation of a convertible machining center, in the macro machining mode, illustrated with associated controls;

DESCRIPTION OF THE PREFERRED EMBODIMENTS

Figure 2:
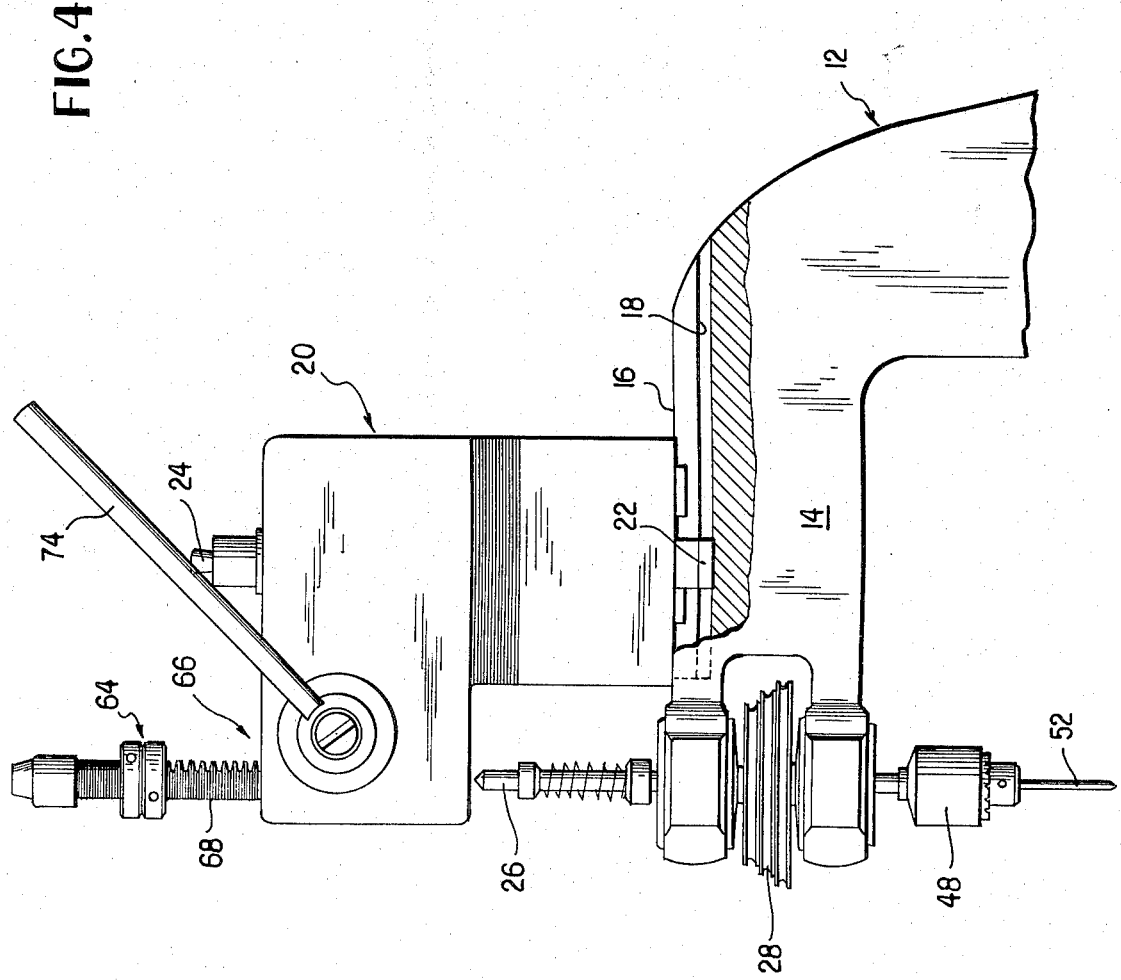
FIG. 2 is a fragmentary side elevation of the machining center shown in FIG. 1 with parts broken away and an upper infeed station removed.
Figure 3:
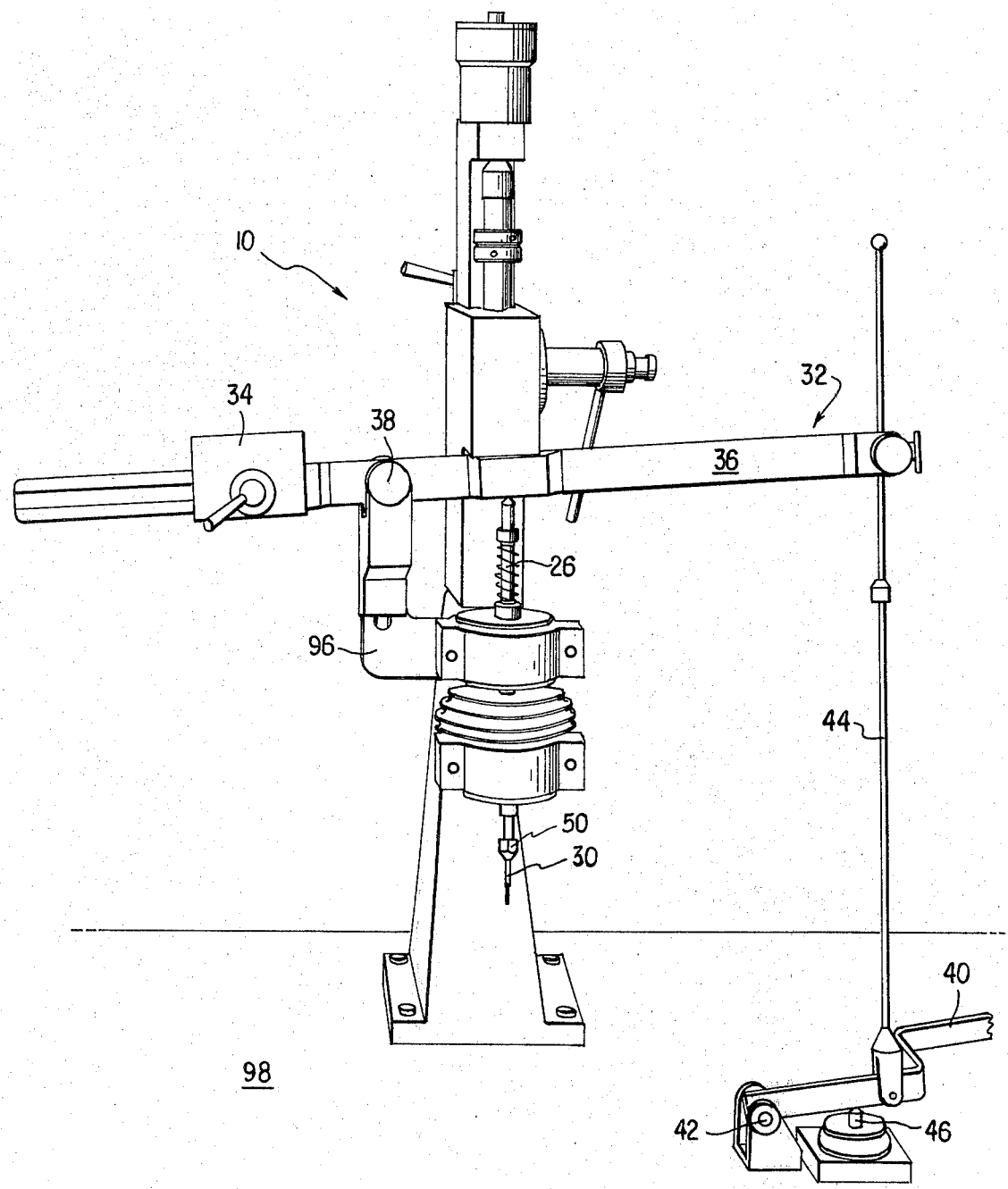
FIG. 3 is a front elevation of the convertible machining center of FIG. 1 in the micro machining mode.

The invention is directed to a machining center 10 readily convertible from the micro machining mode shown in FIG. 3 to either of the macro machining set-ups shown in FIGS. 1 and 2. The convertible use of the machining center for micro and macro drilling will be specifically described with the understanding that the invention is equally applicable to those other machining operations employing a chuck or collet mounted tool adapted to be infed to a workpiece irrespective of whether such infeed is accompanied by tool rotation.

Machine frame 12 includes a short cantilevered arm 14 of relatively massive construction whose top, flat face 16 is formed with a longitudinal T slot 18 opening at the juncture of arm 14 with the base frame 12. A macro tool infeed station 20 is mounted for adjustable, sliding movement between the forward, working position shown in FIGS. 1 and 2 and the rearward non-working position shown in FIGS. 3 and 6 through the intermediary of a T locking bar 22, coacting with T slot 18, which is tensioned in conventional fashion via a threaded connector, not shown, actuated by locking lever 24. At the forward end of arm 14 is mounted, in conventional fashion, infeed tool spindle 26 and tool drive pulley 28, all as presently manufactured by National Jet Company of Cumberland, Maryland for the Model M1 micro drilling machine and as more fully described in National Jet Company Technical Bulletin M1-168.

In the micro drilling mode as illustrated in FIG. 3, rotation and reciprocation of micro drill 30 is effected, respectively, by flexible drive belt engagement with pulley 28 and cross arm infeed assembly 32. Typically, cross arm balance weight 34 is adjusted on cross arm 36 to produce virtually zero torque about pivot axis 38. Infeed pressure is imparted to infeed tool spindle 26 via actuating lever 40, pivoted at 42, adjustable connecting rod 44 and a bearing surface on the underside of cross arm 36. An adjustable depth stop 46, previously described, controls the infeed of micro tool 30. Because of the extremely light infeed pressures necessarily used with micro tooling to avoid tool breakage there is negligible spring back through the cross arm, connecting rod and actuating lever.

When a macro tooling chuck 48, as shown in FIG. 1, is substituted for the micro tool engaging collet 50 of FIG. 3 as described and illustrated in National Jet Company Technical Bulletin No. M1-RP-777, any attempt to impose necessary infeed pressures to macro tool 52 via the cross arm infeed assembly 32 shown in FIG. 3 results in unacceptably large spring back flexures. Conventional practice has sought to reduce spring back by a reduction in reactive path length and confining the same to relatively massive members as illustrated in FIG. 5 and more fully described in National Jet Company Technical Bulletin No. M1-RP-777.

Figure 5:
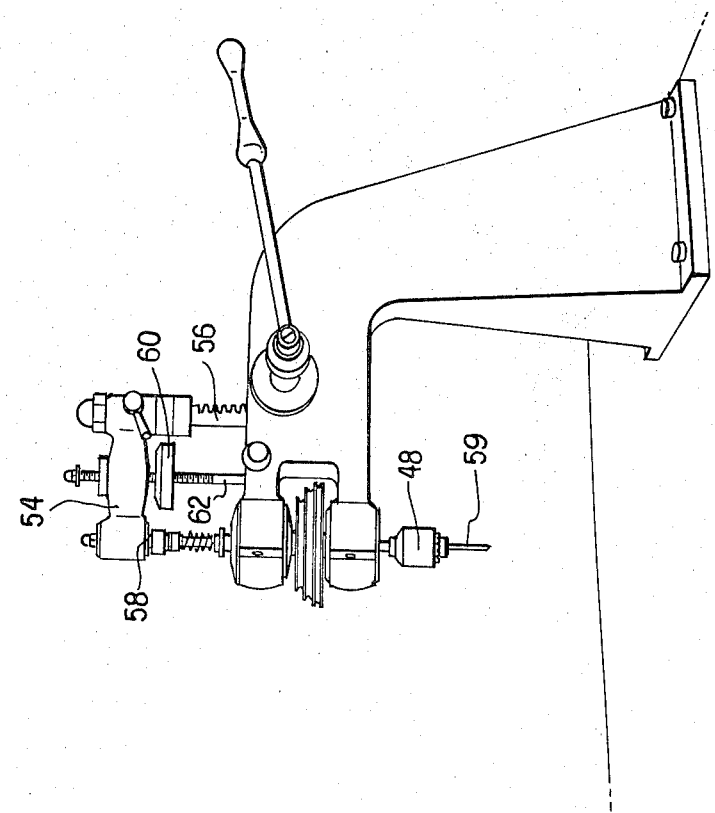
FIG. 5 is a perspective view of a prior art macro drilling machine.

In FIG. 5, the prior art reactive path length along which spring back occurs comprises cross head 54 and rack 56. The torque exerted on cross head 54 about the infeed spindle engaging end 58 by the downward movement of rack 56 is magnified by the length of the cross head between the spindle engaging portion and the infeed rack as tool 59 engages the workpiece. Secondary spring back occurs as the depthing stop 60, adjustably supported on guide post 62, is engaged at which time cross head 54 acts as a first class lever. Although in many cases this reactive spring back is imperceptible to the human eye it is unacceptable in precision blind hole drilling for other than trial and error machining. Stated differently, it is desirable to totally eliminate, for all intents and purposes, any spring back whatsoever so that upon infeeding to a preset drill stop position one may be assured that tool infeed travel will exactly equal the actuating input.

This is accomplished by eliminating substantially all torque moments along the reactive path length and, further, limiting that reactive path to working elements in substantially pure compression. This latter concept, that of restricting the reactive path to one in substantially pure compression, is simply stated but the prior failure to recognize the same is fully explanatory of the previous acceptance of some degree of spring back as an inherent limitation. The solution lies, as best illustrated in FIG. 2, in colinear positioning of the tool 52, infeed tool spindle 26, infeed driver assembly 66 and depthing stop 64.

Figure 4:
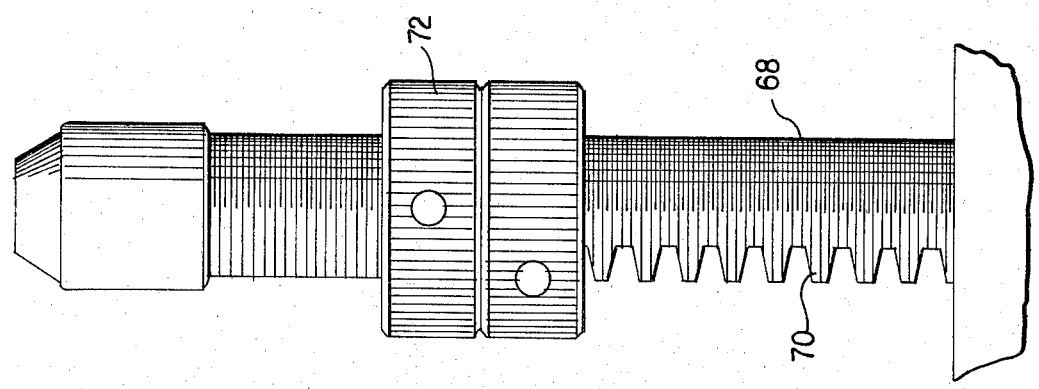
FIG. 4 is a detail showing of the threaded rack of FIG. 2 as viewed from the opposite side thereof.

The infeed driver assembly 66, which is axially aligned with infeed spindle 26 in the forward working position of FIG. 2, comprises a rack 68, best shown in FIG. 4, the axial length of which is threaded throughout and across rack teeth 70 for the adjustable screw threaded receipt of a pair of locking nuts 72 which comprise the adjustable depth stop 64 which is, of course, colinear with tool infeed spindle 26 in the forward working position of FIG. 2.

Infeed driver assembly 66 may be pinion operated, as in FIG. 2, through the intermediary of lever 74 or, as illustrated in FIG. 1, an alternate infeed driver assembly 76 may be employed which uses a conventional, digital micrometer infeed head 78, having a non-rotative output spindle 80, manufactured by Mitutoyo Manufacturing Company, Ltd. of Japan under model designation 297-201-01 and distributed by M.T.I. Corporation, 11 East 26th Street, New York, N.Y. 10010. In either event, the reactive path from the macro tool 52 back to the infeed driver assembly and depth stop is in substantially pure compression. Infeed driver assembly 66 (FIG. 2) may be readily converted to the driver assembly 76 of FIG. 1 for selective, alternate use of the pinion or micrometer operated infeed modes by "piggy backing" a second macro tool infeed station 82, on which micrometer infeed head 78 is mounted, to the flat upper surface of the macro tool infeed station 20 shown in FIG. 2. The interconnection, not illustrated, between infeed stations 20 and 82 is via a T slot formed on the upper surface of station 20 and a T locking bar and threaded rod which is tensioned by handle 84 as already described in connection with the positioning of infeed station 20 on arm 14.

The manual infeed to rack 68 via hand lever 74 is, of course, through the lever connected pinion and rack teeth 70 while the infeed from micrometer head 78 is effected by rotation of indexing cap 86 which advances micrometer spindle 80 to infeed rack 68. It will be apparent that, in either mode of operation; when the desired drilling depth, established by the selective setting of depth stop 64, is reached there will be no reactive spring back since all of the elements comprising the reactive path length are in substantially pure compression under load. The same is true of each infeed cycle prior to reaching the depthing stop since the reaction to tool infeed pressures terminates at either the rack teeth pinion engagement or the coaxially aligned micrometer spindle 80.

In FIG. 1 is illustrated one mode of semi-automatic operation employing preset indexer controls 88 manufactured by Superior Electric Company of Bristol, Connecticut under model designation SP-151 for controlling workpiece movement via compound positioning stepper motors which may include x and y motors 90, 92, the positional read out of which is displayed on a conventional "Accu-rite 5" 94 manufactured by Bausch and Lomb of Rochester, N.Y.

Figure 6:
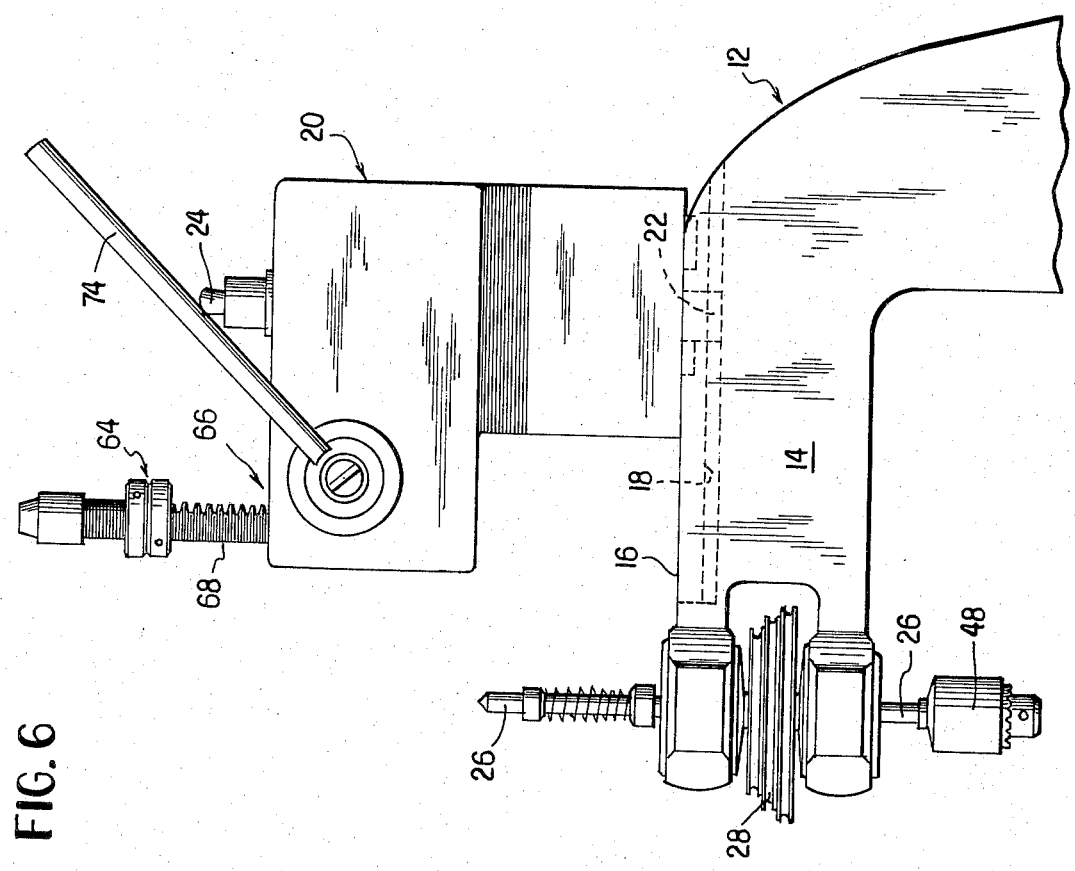
FIG. 6 is a view similar to FIG. 2 but showing the macro tool infeed station removed to a non-working position preparatory to use of the machine for micro machining.

Conversion of the equipment from macro to micro drilling involves repositioning macro tool infeed station 20 from the forward working position of FIGS. 1 and 2 to the non-working position of FIG. 6. It will be noted that such repositioning requires only that T locking bar 22 be released by rotation of lever 24 and this is true whether or not the second infeed station 82 is "piggy backed" on infeed station 20. Cross arm infeed assembly 32 is thereafter connected to support bracket 96 and infeed lever 40 connected to worktable 98 at pivot 42. Following the substitution of a micro tool engaging collet 50 for the chuck 48, the conversion from macro to the micro drilling mode is complete.

As will be apparent from the foregoing discussion of the reactive spring back path and its termination at either the point of input pressure application or at the depth stop, whichever comes first, the massivity of the machine frame structure as compared to the possible magnitude of input pressure application is such as to be considered infinite; in other words, the frame 12, station 20 and arm 14 do not yield under working input pressures.

In operation, infeed station 20 and the infeed driver assembly 66 may be employed, alone, as in FIG. 2 where precise infeed increments are not required but when the nature of the workpiece requires more precise infeed control, infeed driver assembly 76 is preferably employed as in FIG. 1. Infeed control by assembly 76 can, of course, be fully automated by the use of a programmed stepper motor to rotate the indexing cap 86 rather than the manual indexing described.

I claim:

1. In a machining center selectively convertible between micro and macro machining operations including a tool infeed spindle mounted for reciprocal movement along a tool infeed axis and adapted to carry a tool at one end thereof; a first infeed station mounted on said center for infeeding said tool spindle during micro machining operations; a second infeed station mounted on said center and supporting an infeed driver assembly for infeeding said tool spindle during macro machining operations; the improvement wherein said infeed driver assembly includes an elongate infeed driver comprising a rack screw threaded along at least a portion of its length and engaging the other end of said tool infeed spindle, and an adjustable depth stop threaded on said rack and coaxial with said tool infeed spindle for infeeding the same along said axis to a preset depth setting.

2. The improvement in a machining center of claim 1 wherein said infeed driver assembly includes actuating means for infeeding said rack along said axis in substantially pure compression whereby bending moments are eliminated from the reactive path length extending between a spindle mounted tool and the depth stop.

3. The improvement in a machining center of claim 2 wherein the actuating input to said rack is colinear therewith whereby bending moments are eliminated from the reactive path length extending between a spindle mounted tool and said actuating means.

4. The improvement in a machining center of claim 3 including means mounting said second infeed station for selective movement to a non-working position remote from said tool infeed axis; and means for mounting said first infeed assembly to said center for infeeding said infeed spindle when said second infeed station is in said non-working position.

* * * * *